United States Patent
Ooi et al.

(10) Patent No.: US 7,038,887 B2
(45) Date of Patent: May 2, 2006

(54) OVERMOLDED CRASH STOP FOR A DISC DRIVE

(75) Inventors: Tak Koon Ooi, Singapore (SG); YongJie Tang, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 223 days.

(21) Appl. No.: 10/291,269

(22) Filed: Nov. 8, 2002

(65) Prior Publication Data
US 2003/0206378 A1 Nov. 6, 2003

Related U.S. Application Data

(60) Provisional application No. 60/377,760, filed on May 3, 2002.

(51) Int. Cl.
*G11B 5/55* (2006.01)

(52) U.S. Cl. .................................... 360/265.1
(58) Field of Classification Search .............. 360/265.1
See application file for complete search history.

(56) References Cited

U.S. PATENT DOCUMENTS

| | | | |
|---|---|---|---|
| 5,025,336 A * | 6/1991 | Morehouse et al. ..... | 360/97.02 |
| 5,134,608 A | 7/1992 | Strickler et al. | |
| 5,600,516 A * | 2/1997 | Phillips et al. ........... | 360/265.1 |
| 5,731,933 A | 3/1998 | Sonderegger et al. | |
| 5,812,346 A * | 9/1998 | Williams et al. ......... | 360/256.2 |
| 5,864,449 A | 1/1999 | Dominguez, Jr. et al. | |
| 5,905,606 A | 5/1999 | Johnson et al. | |
| 6,115,222 A | 9/2000 | Andrews et al. | |
| 6,236,531 B1 | 5/2001 | Allsup et al. | |
| 6,252,745 B1 | 6/2001 | McReynolds et al. | |
| 6,567,242 B1 * | 5/2003 | Misso et al. ............. | 360/265.1 |
| 2002/0012203 A1 * | 1/2002 | Nelson et al. ........... | 360/265.1 |
| 2003/0002223 A1 * | 1/2003 | Misso et al. ............. | 360/265.1 |

* cited by examiner

*Primary Examiner*—Angel Castro
(74) *Attorney, Agent, or Firm*—Derek J. Berger

(57) ABSTRACT

An apparatus restricting motion of an actuator assembly to preclude damage to a read/write head or a disc of a disc drive, the apparatus includes a pole piece with a crash stop mounting aperture and an overmolded crash stop communicating with the crash stop mounting aperture. The overmolded crash stop includes a retention channel formed by a top retention portion, a bottom retention portion and a main body portion during a process of molding the overmolded crash stop to the pole piece. The main body portion conforms to the crash stop mounting aperture, thereby precluding motion of the overmolded crash stop relative to the pole piece in a lateral direction, while the top retention portion and the bottom retention portion constrain motion of the overmolded crash stop relative to the pole piece in the vertical direction.

14 Claims, 2 Drawing Sheets

OVERMOLDED CRASH STOP FOR A DISC DRIVE

RELATED APPLICATIONS

This application claims priority to U.S. Provisional Application No. 60/377,760 filed May 3, 2002 entitled Overmolded Crash Stops On Top Pole.

FIELD OF THE INVENTION

The claimed invention relates generally to the field of digital data storage systems, and more particularly but not by way of limitation, to an overmolded crash stop for a data storage device.

BACKGROUND

Disc drives are used for data storage in modem electronic products ranging from digital cameras to computers and network systems. Ordinarily, a disc drive includes a mechanical portion, or head disc assembly, and electronics in the form of a printed circuit board assembly mounted to an outer surface of the head disc assembly. The printed circuit board assembly controls functions of the head disc assembly and provides a communication interface between the disc drive and a host being serviced by the disc drive.

Typically, the head-disc assembly has a disc with a recording surface rotated at a constant speed by a spindle motor assembly and an actuator assembly positionably controlled by a closed loop servo system. The actuator assembly supports a read/write head that writes data to and reads data from the recording surface.

The disc drive market continues to place pressure on the industry for disc drives with increased capacity at a lower cost per megabyte, higher rates of data throughput between the disc drive and the host and improved reliability.

Crash stops have an important role to play in modem reliable disc chive assemblies. They not only provide a boundary within which the actuator assembly operates, but also protect the read/write head from damage by inhibiting interaction between the read/write head and components near the inner diameter of the disc, and by preventing the read/writehead from extending beyond the outer diameter of the disc.

Prior art crash stops have typically been made from molded rubber or polymer and have generally been inserted into either the basedeck or a pole piece of the voice coil motor. Difficulties surrounding the use of crash stops include: misalignment of crash stops relative to mounting locations; dislodging of the crash stops during disc drive operations following misalignment during the assembly process; inconsistency in placement of the crash stops leading to reliability issues; costly methods of assembling the crash stops into head disc assemblies, and limitations on the rigidity of materials used.

As such, challenges remain and a need persists for improvements in crash stops for use in disc drive type applications.

SUMMARY OF THE INVENTION

In accordance with preferred embodiments, an apparatus restricting motion of an actuator assembly to preclude damage to a read/write head or a disc of a disc drive is disclosed. The apparatus includes a pole piece with a crash stop mounting aperture and an overmolded crash stop communicating with the crash stop mounting aperture. The overmolded crash stop includes a retention channel formed by a top retention portion, a bottom retention portion and a main body portion of the overmolded crash stop during a process of molding the overmolded crash stop to the pole piece.

The main body portion conforms to the crash stop mounting aperture thereby precluding motion of the overmolded crash stop in a lateral direction, relative to the pole piece, while the top retention portion and the bottom retention portion constrain the overmolded crash stop in the vertical direction, relative to the pole piece.

These and various other features and advantages that characterize the claimed invention will be apparent upon reading the following detailed description and upon review of the associated drawings.

DETAILED DESCRIPTION

Figure 1:
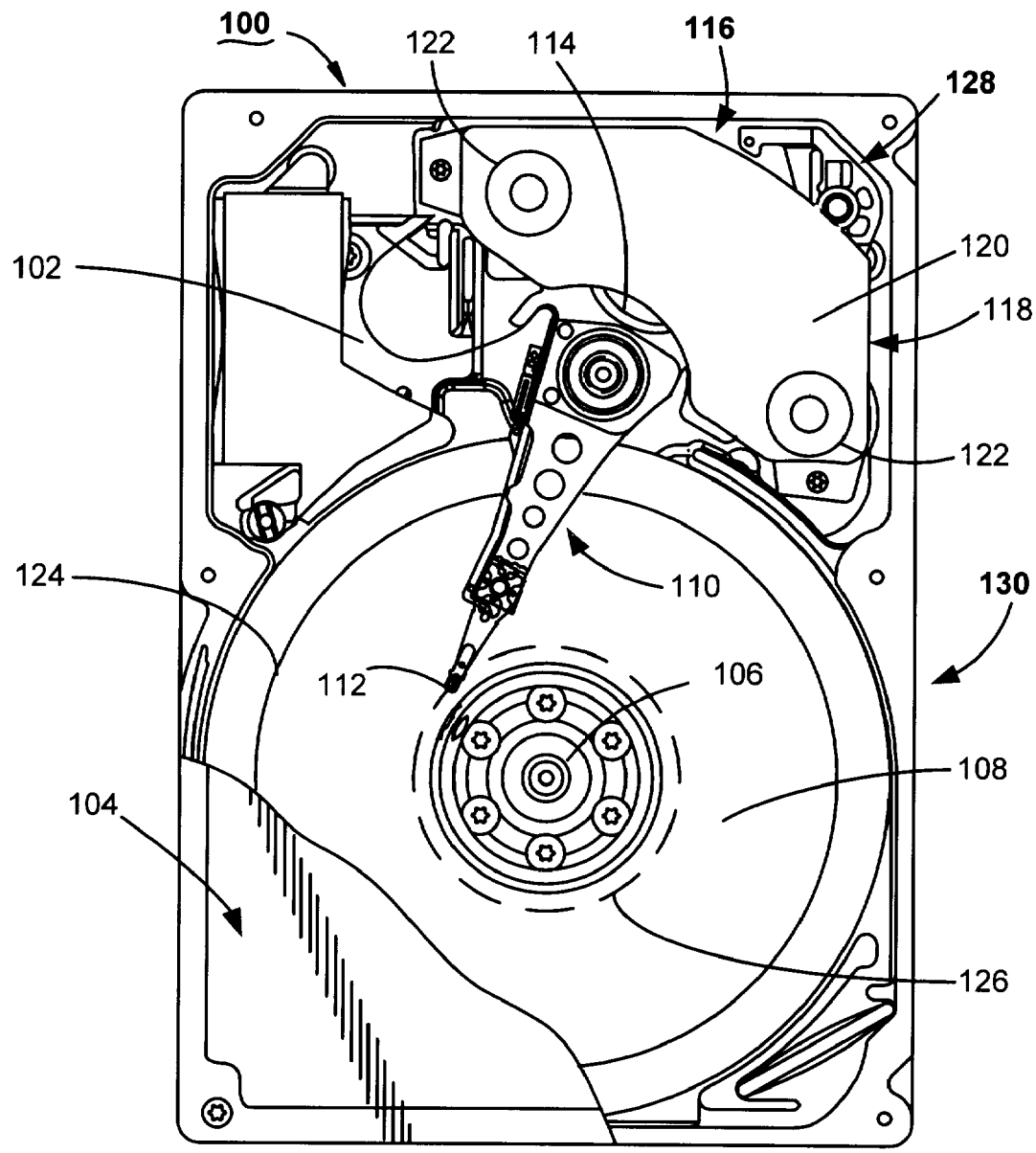
FIG. 1 is a plan view of a disc drive constructed and operated in accordance with preferred embodiments of the present invention.

Referring now to the drawings, FIG. 1 provides a top plan view of a disc drive 100. The disc drive 100 includes a rigid base deck 102, which cooperates with a top cover 104 (shown in partial cutaway) to form a sealed housing for the device. A spindle motor 106 rotates a number of magnetic data storage discs 108 at a constant high speed. A rotary actuator 110 supports a number of data transducing heads 112 (also referred to herein as read/write heads 112 or heads 112) adjacent the discs 108. The actuator 110 is rotated through application of current to a coil 114 of a voice coil motor (VCM) 116. The voice coil motor 116 includes a top portion 118 with a top pole piece 120 and a pair of overmolded crash stops 122.

During data transfer operations with a host device (not shown), the actuator 110 moves the heads 112 to concentric data tracks (one represented at 124) on the surfaces of the discs 108 to write data to and read data from the discs 108. When the disc drive 100 is deactivated, the actuator 110 moves the heads 112 to texturized landing zones 126; the actuator 110 is then confined by latching a toggle latch 128. Command and control electronics for the disc drive 100 are provided on a printed circuit board assembly (PCB) mounted to the underside of the base deck 102. Typically, the mechanical portion of the disc drive 100 is referred to as a head disc assembly 130.

Figure 2:
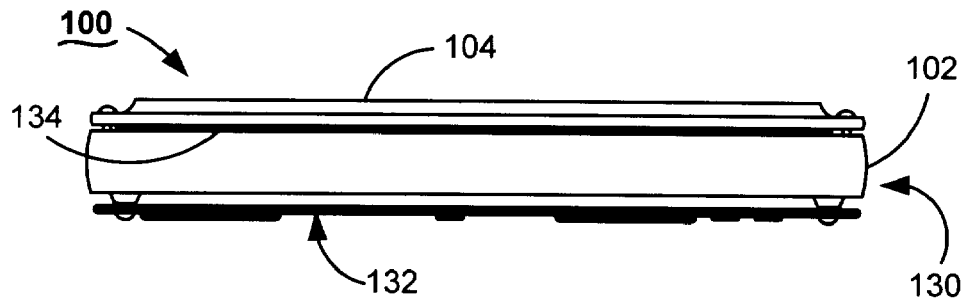
FIG. 2 is an elevational view of the disc drive of FIG. 1.

Turning to FIG. 2, shown therein is a printed circuit board assembly 132 attached to the basedeck 102 of the disc drive 100. Also shown is a gasket 134 compressed between the top cover 104 and the basedeck 102. The gasket 134 in conjunction with the top cover 104 and a basedeck 102 provides a hermetically sealed environment for operation of the head disc assembly 130.

Figure 3:
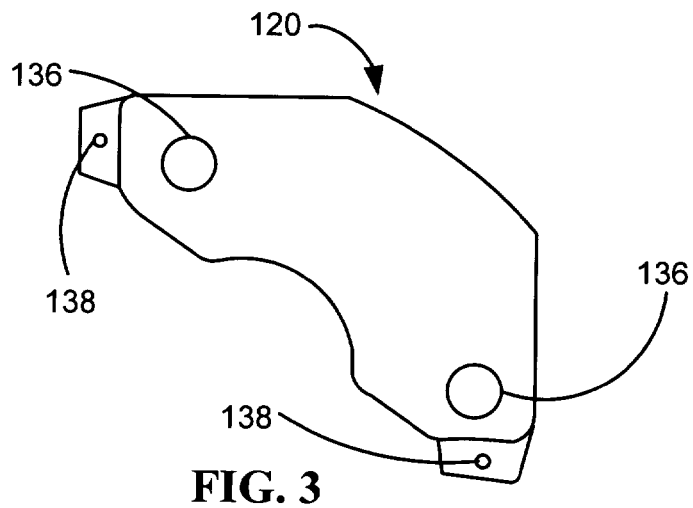
FIG. 3 is a plan view of a top pole piece of the disc drive of FIG. 1.

As shown by FIG. 3, the top pole piece 120 provides a pair of crash stop containment apertures 136 and a pair of attachment apertures 138. In a preferred embodiment, the top pole piece 120 is positioned in a cavity of a mold and the overmolded crash stops 122 are molded in place. By overmolding crash stops 122 directly onto the top pole piece 120, reliability improvements are attained and maintained, those improvements include: improved positional accuracy of each crash stop, relative to the top pole piece 120; crash stops that are securely affixed to the top pole piece 120; consistency of output from the molding process; and reduced manual intervention in the assembly process.

Figure 4:
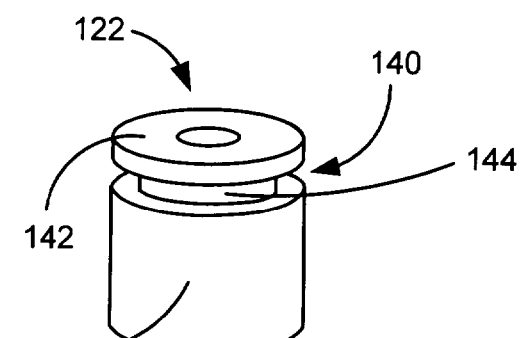
FIG. 4 is a perspective view of an overmolded crash stop of the disc drive of FIG. 1.

FIG. 4 shows a retention channel 140, which accommodates the top pole piece 120. The retention channel 140 is formed from a top retention portion 142; a main body portion 144 and a bottom retention portion 146. In a preferred embodiment, the main body portion 144 conforms tote crash stop containment aperture 136, (of FIG. 3), to restrict lateral motion of the overmolded crash stops 122 relative to the top pole piece 120, while the top retention portion 142 and the bottom retention portion 146 restrict vertical motion of the overmolded crash stops 122 relative to the top pole piece 120. Additionally, the bottom retention portion 146 of each crash slop 122 confines the motion of the actuator assembly 110 within prescribed boundaries to inhibit damage of bead 112 or disc 108 during operation of the disc drive 100, (of FIG. 1).

Figure 5:
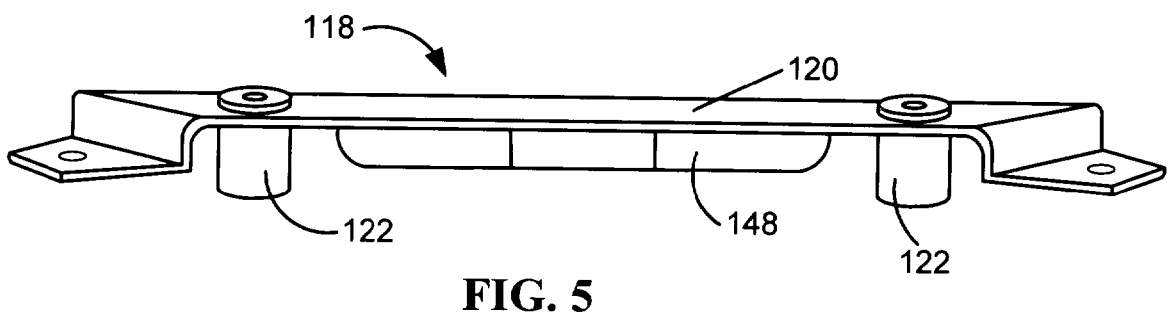
FIG. 5 is a prospective view of a top portion of a voice coil motor of the disc drive of FIG. 1.

FIG. 5 shows a voice coil magnet 148 secured to the top pole piece 120 and adjacent each of the overmolded crash stops 122 of the top portion 118 of the voice coil motor 116 (of FIG. 1). Following the overmolded process, in which each of the overmolded crash stops 122 are molded in place to the top pole piece 120, the voice coil magnet 148 is secured to the top pole piece 120.

With the top portion 118 of the voice coil motor 116 secured in place adjacent the coil 114 of the voice coil motor 116, positional control of the actuator assembly 110 is attained by controlling the current provided to the coil 114 (of FIG. 1). However, in situations where the current supplied to the coil 114 attempts to drive the head 112 of the actuator assembly 110 into the spindle motor 106, or attempts to drive the head 112 beyond the outer diameter of the disc 108, the overmolded crash stops 122 limit the motion of the actuator assembly 110 by halting progress of the coil 114 upon engagement of the coil 114 with either of the overmolded crash stops 122.

In accordance with preferred embodiments, an overmolded crash stop (such as 122) is molded in place to a top pole piece (such as 120). A crash stop containment aperture (such as 136) accommodates the overmolded crash stop. A retention channel (such as 140) is formed in the overmolded crash stop during the molding process. A top retention portion (such as 142), a main body portion (such as 144) and a bottom retention portion (such as 146) define the boundaries of the retention channel. The main body portion of the overmolded crash stop conforms to the crash stop mounting aperture and restricts movement of the overmolded crash stop in a lateral direction, while the top retention portion in conjunction with the bottom retention portion restrict motion of the overmolded crash stop in the vertical direction.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts, within the principles of the present invention to the full extent indicated by the broad general meaning of the terms in which the appended claims are expressed without departing from the spirit and scope of the present invention.

What is claimed is:

1. A crash stop limiting an extent of travel of an actuator that is in a data transfer relationship with a data storage medium, the crash stop supported solely at a portion of one pole piece of a voice coil motor that is disposed in a parallel plane in relation to the actuator travel by sandwiching the pole piece between retention portions of the crash stop.

2. The crash stop of claim 1 wherein the pole piece defines an aperture through which a body portion of the crash stop passes and connects the retention portions.

3. The crash stop of claim 2 wherein the retention portions comprise cylindrical members with diameters spanning beyond the aperture.

4. The crash stop of claim 2 wherein the body portion conforms to the aperture, fixing the crash stop laterally in relation to the pole piece.

5. The crash stop of claim 2 wherein the body and retention portions are unitarily constructed.

6. The crash stop of claim 2 made by a process of molding the crash stop in place to the pole piece.

7. The crash stop of claim 2 wherein the retention portions conform to opposing surfaces of the pole piece, fixing the crash stop longitudinally in relation to the pole piece.

8. The crash stop of claim 1 wherein one of the retention portions extends away from the pole piece toward an opposing pole piece of the voice coil motor defining an abutment member in the path of actuator travel and terminating at a distal end that clearingly disengages the opposing pole piece.

9. A disc drive comprising:
an actuator in a data transfer relationship with a data storage medium; and
means for supporting a crash stop restricting motion of the actuator.

10. The disc drive of claim 9 wherein the means for supporting is characterized by cantilevering the crash stop in a path of movement of the actuator.

11. The disc drive of claim 9 wherein the means for supporting is characterized by fixing a portion of the crash stop longitudinally in relation to the actuator.

12. The disc drive of claim 9 wherein the means for supporting is characterized by fixing a portion of the crash stop laterally in relation to the actuator.

13. The disc drive of claim 9 wherein the means for supporting is characterized by unitarily constructing the crash stop.

14. The disc drive of claim 9 wherein the means for supporting is characterized by overmolding the crash stop.

* * * * *